US009031692B2

(12) United States Patent
Zhu

(10) Patent No.: US 9,031,692 B2
(45) Date of Patent: May 12, 2015

(54) CLOUD ROBOT SYSTEM AND METHOD OF INTEGRATING THE SAME

(75) Inventor: Dingju Zhu, Guangdong (CN)

(73) Assignee: Shenzhen Institutes of Advanced Technology Chinese Academy of Science, Guangdong (CN)

( * ) Notice: Subject to any disclaimer, the term of this patent is extended or adjusted under 35 U.S.C. 154(b) by 95 days.

(21) Appl. No.: 13/818,739

(22) PCT Filed: Aug. 11, 2011

(86) PCT No.: PCT/CN2011/078246
§ 371 (c)(1),
(2), (4) Date: Mar. 8, 2013

(87) PCT Pub. No.: WO2012/025014
PCT Pub. Date: Mar. 1, 2012

(65) Prior Publication Data
US 2013/0166621 A1      Jun. 27, 2013

(30) Foreign Application Priority Data

Aug. 24, 2010   (CN) .......................... 2010 1 0270839

(51) Int. Cl.
*H04L 29/08*   (2006.01)
*B25J 9/16*    (2006.01)

(52) U.S. Cl.
CPC .............. *H04L 67/12* (2013.01); *Y10S 901/46* (2013.01); *Y10S 901/50* (2013.01); *B25J 9/161* (2013.01); *G05B 2219/34019* (2013.01); *G05B 2219/33333* (2013.01)

(58) Field of Classification Search
CPC ......... H04L 67/12; H04L 63/20; H04L 63/08; B25J 9/161; Y10S 901/46; Y10S 901/50; G05B 2219/33333; G05B 2219/34019; G06N 5/00; E21B 49/00; G06F 9/4445; G06F 9/54; G06F 9/455; G06F 2209/549
See application file for complete search history.

(56) References Cited

U.S. PATENT DOCUMENTS 7,996,352 B2 *   8/2011   Jung et al. ........................ 706/47
8,190,543 B2 *   5/2012   Kaushal et al. .................. 706/45
(Continued)

FOREIGN PATENT DOCUMENTS

CN          1846949 A     10/2006
CN        101359225 A      2/2009
(Continued)

OTHER PUBLICATIONS

Communication From the Japanese Patent Office Regarding a Counterpart Foreign Application Dated (Japanese Emperor Year H26) Feb. 20, 2014.

*Primary Examiner* — Bao Long T Nguyen
(74) *Attorney, Agent, or Firm* — Rosenberg, Klein & Lee

(57) ABSTRACT

The present disclosure discloses a cloud robot system, including: a cloud computing platform and at least one robot; wherein the cloud computing platform is used for receiving perform information sent by the at least one robot in the system; the perform information includes data, status and requests of the at least one robot; the cloud computing platform is used for processing the data and status, sending process results back to the at least one robot, and sending control instructions to corresponding robot according to the requests; the at least one robot is used for sending the perform information to the cloud computing platform, receiving process results from the cloud computing platform, and performing according to the control instructions sent from the cloud computing platform. By using the present disclosure, computing ability and storage capacity of the robots can be expanded unlimited, while the thinking ability and memory of the robots are improved. Besides, the ability of the brains of the robots can be allocated according to demand, thus lowering the cost of the robots.

10 Claims, 1 Drawing Sheet

(56) References Cited

U.S. PATENT DOCUMENTS

| | | | |
|---|---|---|---|
| 8,468,455 B2* | 6/2013 | Jorgensen et al. | 715/733 |
| 2004/0098167 A1 | 5/2004 | Yi et al. | |
| 2005/0105504 A1 | 5/2005 | Sakoda | |
| 2006/0235570 A1 | 10/2006 | Jung | |
| 2007/0187655 A1 | 8/2007 | Wang et al. | |
| 2009/0132458 A1* | 5/2009 | Edwards et al. | 706/50 |
| 2010/0106792 A1 | 4/2010 | Karstens | |
| 2011/0307599 A1* | 12/2011 | Saretto et al. | 709/224 |

FOREIGN PATENT DOCUMENTS

| | | |
|---|---|---|
| CN | 101777792 A | 7/2010 |
| CN | 101973031 A | 2/2011 |
| JP | H09-153402 A | 6/1997 |
| JP | 2001-23803 A | 1/2001 |
| JP | 2002-25806 A | 1/2002 |
| JP | 2003-234202 A | 8/2003 |
| JP | 2004-243475 A | 9/2004 |
| JP | 2004-306242 A | 11/2004 |
| JP | 2004-309523 A | 11/2004 |
| JP | 2007-42667 A | 2/2007 |
| JP | 2007-221119 A | 8/2007 |
| JP | 2007-237300 A | 9/2007 |
| JP | 2008-146149 A | 6/2008 |
| WO | 2004/071021 A1 | 8/2004 |
| WO | 2005/086051 A1 | 9/2005 |
| WO | 2009/102970 A2 | 8/2009 |

* cited by examiner

CLOUD ROBOT SYSTEM AND METHOD OF INTEGRATING THE SAME

FIELD OF THE INVENTION

The present disclosure relates to information technologies, more particularly, to a cloud robot system and a method of integrating the cloud robot system.

BACKGROUND OF THE INVENTION

Conventional robots generally use chips as brains of the robots. The conventional robots have some problems:
1) Since the brains of the conventional robots are the chips installed in the robots themselves, the robots own limited computing ability and storage capacity which are limited by computing ability and storage capacity of the chips.
2) No matter the robots compute or not, and no matter problems the robots are solving is complicated or simple, the robots occupy fixed computing ability and storage capacity.
3) Interaction between robots needs peer to peer communication, when there are M robots for communicating, there will be M*(M−1)/2 communication paths, which are not easy to manage and may lead chaos.

Thus, the conventional robots need to be improved and developed,

SUMMARY OF THE INVENTION

It is an object of the present invention to provide a cloud robot system and a method of integrating the cloud robot system.

A cloud robot system, including: a cloud computing platform and at least one robot; wherein the cloud computing platform is used for receiving perform information sent by the at least one robot in the system; the perform information includes data, status and requests of the at least one robot; the cloud computing platform is used for processing the data and status, sending process results back to the at least one robot, and sending control instructions to corresponding robot according to the requests; the at least one robot is used for sending the perform information to the cloud computing platform, receiving process results from the cloud computing platform, and performing according to the control instructions sent from the cloud computing platform.

In a preferred embodiment, each robot includes a first communication module, the cloud computing platform includes a second communication module; the robot and the cloud computing platform build wired or wireless connections to communicate with each other through the first communication module and the second communication module; and all the robots under a same cloud computing platform communicates with each other through the same cloud computing platform.

In a preferred embodiment, the robot further includes: sensors, used for collecting data; a monitor module, used for monitoring behavior and status of the robot according to process results sent back from the cloud computing platform and sending the data collected by the sensors, status of the robot and service requests to the cloud computing platform in time.

In a preferred embodiment, the cloud computing platform includes at least one cloud brain module, each of which corresponds to one robot; the cloud brain module stores knowledge base, inference engine, neural network, data and experience of the robot; the cloud brain module is used further for processing the data, status and request sent from the robots, sending the process results back to the robots.

In a preferred embodiment, the cloud computing platform includes at least one social module, each of which corresponding to at least one cloud brain module; the social module is used for intercommunication between cloud brain modules of different robots, analyzing and mining of robot group information to realize cooperating and linking; through the social module the robots join in or quit the robot group.

In a preferred embodiment, the cloud computing platform further includes: a system creating module, used for cloning a corresponding cloud brain module in the cloud computing platform and a social module for a newly joined robot.

In a preferred embodiment, the cloud computing platform includes super computers, computer cluster and distributed interconnected computers.

In a preferred embodiment, the cloud brain module distributed parallel processes the data, status and requests sent from the robots.

In a preferred embodiment, the computing ability and storage capacity of the cloud computing platform are expandable, and the computing and storage resources are allocated according to demand of robots.

A method of integrating a cloud robot system, including:
accessing to a cloud computing platform by robots through communication modules;
sending perform information containing data collected by sensors, status of the robots and requests to the cloud computing platform by robots;
processing the data, status and request by a cloud computing platform, and sending the process results back to the robots, sending control instructions to corresponding robot according to the request; the cloud computing platform further analyzing and mining of robot group information;
controlling behavior and status by robots according to the processing result: receiving the process results from the cloud computing platform and performing according to the control instructions sent from the cloud computing platform; the robots further communicating through the cloud computing platform, realizing cooperating and linking.

In a preferred embodiment, the robot includes a first communication module, the cloud computing platform includes a second communication module; the step of accessing to a cloud computing platform by the robots through communication modules includes: the robot and the cloud computing platform building wired or wireless connections to communicate through the first communication module and the second communication module; and all the robots under a same cloud computing platform communicating with each other through the same cloud computing platform.

In a preferred embodiment, the method further including: processing requests from the robot itself by a local brain module.

In a preferred embodiment, the method further including: through a cloud brain module, the cloud computing platform storing knowledge base, inference engine, neural network, data and experience of the robot; and processing the data, status and request sent from the robots, sending back the processing result to the robots.

In a preferred embodiment, the method further including: through a social module, the cloud computing platform providing intercommunication between cloud brain modules of different robots, analyzing and d mining of robot group information to realize cooperating and linking; through the social module the robots join in or quit the robot group.

In a preferred embodiment, the method further including: through a system creating module, the cloud computing platform cloning a corresponding cloud brain module in the cloud computing platform and a social module for a newly joined robot.

In a preferred embodiment, the cloud computing platform includes super computers, computer cluster and distributed interconnected computers.

In a preferred embodiment, the cloud brain module distributed parallel processes the data, status and request sent from the robots.

In a preferred embodiment, the computing ability and storage capacity of the cloud computing platform are expandable, and the computing and storage resources are allocated according to demand of robots.

By using the aforementioned cloud robot system and method, the computing ability and storage capacity of the robots can be expanded unlimited, while the thinking ability and memory of the robots are improved. Besides, the ability of the brains of the robots can be allocated according to demand, thus lowering the cost of the robots.

DETAILED DESCRIPTION OF THE EMBODIMENTS

The invention will be described in detail with the following embodiments and drawings.

Figure 1:
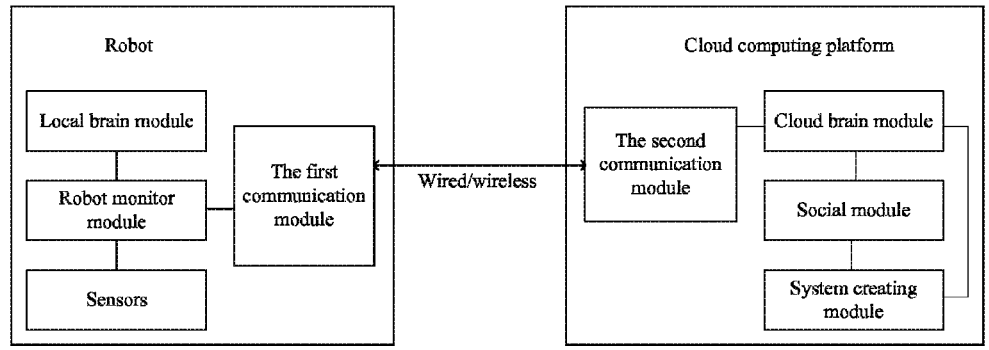
FIG. 1 is a block diagram of a cloud robot system according to an embodiment of the present disclosure.

Referring to FIG. 1, a cloud robot system using a cloud computing platform to compute, store and cooperate is provided. The cloud robot system includes a cloud computing platform and at least one robot.

The cloud computing platform receives perform information sent by at least one robot in the system, wherein the perform information includes data, status and request of the robot. The cloud computing platform processes data and status contained in the perform information, and sends process results back to the robot. The cloud computing platform also sends control instructions to corresponding robot according to the request contained in the perform information.

The robot sends the perform information to the cloud computing platform, receives process results from the cloud computing platform, and performs according to the control instructions sent from the cloud computing platform.

The cloud computing platform is a control center of the robots, and the robots are separated from the cloud computing platform. Each of the robots includes a first communication module, the cloud computing platform includes a second communication module. Through the first communication module and the second communication module, the robots and the cloud computing platform build wired or wireless connections in order to communicate. Computing and storing tasks of the robots are transmitted to the cloud computing platform via the wired or wireless connections. The cloud computing platform processes and sends process results back to the robots. The cloud computing platform may serve a plurality of robots at the same time, just like a think tank may serve many people. All the robots under the same cloud computing platform communicate with each other through the same cloud computing platform.

The robot includes: a local brain module, a robot monitor module, the first communication module and sensors. The local brain module processes minor and low-level requests from the robot itself. The robot monitor module controls behavior and status of the robot according to the process results sent back from the cloud computing platform, and sends the data collected by the sensors, status of the robot and service request to the cloud computing platform in time. The first communication module communicates with the second communication modulo of the cloud computing platform through the wired or wireless connections.

The cloud computing platform includes at least one cloud brain module, each of which corresponds to a robot. The cloud brain module stores knowledge base, inference engine, neural network, data and experience of the robot. The cloud brain module also processes the data, status and request sent from the robots, and sends the processing result back to the robots. The cloud brain module distributed parallel processes the data, status and request sent from the robots. The data includes but not limited to data from vision sensor, data from temperature sensor, data from hearing sensor, data from taste sensor, fault data and barricade data.

The cloud computing platform includes at least one social module, each of which corresponds to at least one cloud brain module. The social module is for fast intercommunication between cloud brain modules corresponding to different robots, analyzing and mining of robot group information, realizing cooperating and linking between robots. Through the social module, the robots join in or quit the robot group.

The cloud computing platform further includes a system creating module. The system creating module creates cloud robot system containing the above modules for the robot service provider. The creation includes but not limited to cloning a corresponding cloud brain module in the cloud computing platform and a social module for a newly joined robot.

The computing ability and storage capacity of the cloud computing platform are expandable, and the computing and storage resources are allocated according to demand of robots.

The robots using the cloud computing platform become cloud robots. These cloud computing platforms may be super computers, computer cluster, distributed interconnected computers and any other form of a sot of computing and storing resources. The cloud computing platform communicates with the robots via the wired or wireless connections.

By the cloud computing platform, the limited computing ability and storage capacity of the robots become unlimited.

Computing and storing tasks of the robots are transmitted to the cloud computing platform, process results are sent back to the robots. Interactions between robots are completed through interactions between the robots and the cloud computing platform.

Figure 2:
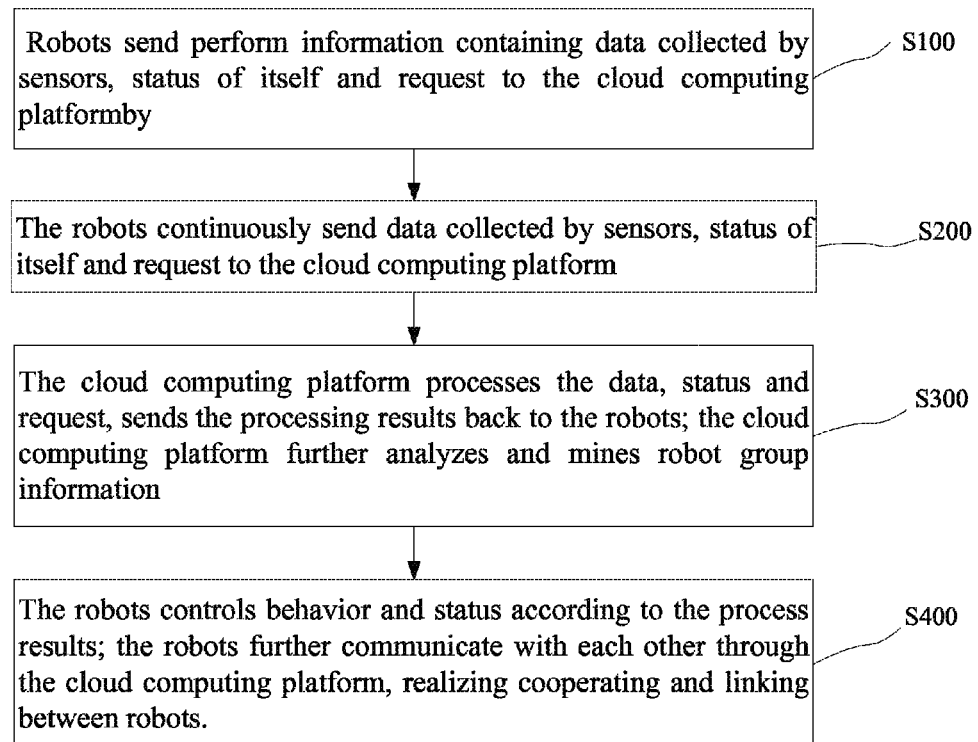
FIG. 2 is flowchart of a method of integrating the cloud robot system according to an embodiment of the present disclosure.

Referring to FIG. 2, a method of integrating cloud robot system is provided including the following steps.

S100: Robots accessing to a cloud computing platform through communication modules.

S200: The robots continuously sending data collected by sensors, status of itself and request to the cloud computing platform.

S300: The cloud computing platform processes the data, status and request, sends the processing results back to the robots; the cloud computing platform further analyzing and mining of robot group information.

S400: The robots controls behavior and status according to the processing results; the robots further communicates with each other through the cloud computing platform, realizing cooperating and linking between robots.

According to the group information, the robots communicate with each other, thus realizing cooperating and linking.

The cloud robots have a super brain which is not in the robots but in the cloud brain module of cloud computing platform. The super brain stores knowledge base, inference engine, neural network, data and experience of the robot. The robot monitor module receives data from the sensors and continuously sends to the cloud brain module. The cloud brain module processes the data and sends the processing results and control instructions back to the robot monitor module, thus influence behavior and status of the robots. Through social module, brains of different robots are in the cloud, thus the robots communicate more fast and vast. The system service can be created for the service provider through system creating module.

The computing ability and storage capacity of the cloud robots is more powerful than the conventional robots because the computing ability and storage capacity of the cloud computing platform can be expanded according to demand; the cloud robots cost less than then the conventional robots do because the computing and storage resources cost according to object demand of the robots; communication between the cloud robots is more effective because the cloud robots only have to communicate with the cloud computing platform, the communication topology is simpler. The cloud computing platform may use collective communication to lower communication amount.

The method of the present disclosure may be used on other devices beside the above robots.

The cloud computing platform may be other net computing platform or remote server.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A cloud robot system, comprising:
  a cloud computing platform and multiple robots;
  wherein the cloud computing platform is configured for receiving perform information sent by each of said multiple robots in said cloud robot system;
  the perform information comprises data, status and requests of each of said multiple robots;
  the cloud computing platform is configured for processing the data and status of each of said multiple robots, sending process results back to each of said multiple robots, and sending control instructions to a corresponding robot according to the requests;
  each of said multiple robots is configured for sending the perform information to the cloud computing platform, receiving process results from the cloud computing platform, and performing according to the control instructions sent from the cloud computing platform;
  wherein each of said multiple robots comprises a first communication module, the cloud computing platform comprises a second communication module;
  each of said multiple robots and the cloud computing platform are connected by wired or wireless connections to communicate with each other through the first communication module and the second communication module;
  said multiple robots under said cloud computing platform communicate with each other through said cloud computing platform, the cloud computing comprising multiple cloud brain modules, each of said multiple cloud brain modules corresponding to a respective robot of said multiple robots; and each of said multiple robots further comprises:
  a local brain module, configured for processing self-generated requests;
  sensors, configured for collecting data; and
  a monitor module, configured for monitoring behavior and status of each corresponding robot according to process results sent back from the cloud computing platform and sending the data collected by the sensors, status of each corresponding robot and service requests to the cloud computing platform in time;
  wherein each cloud brain module stores knowledge base, inference engine, neural network, data and experience of each corresponding robot; and
  each cloud brain module is configured further for processing the data, status and request sent from each corresponding robot, and sending the process results back to each corresponding robot, and
  wherein the cloud computing platform further includes a plurality of social modules, each of the social modules corresponding to each of the cloud brain modules, each of the social modules bein configured for intercommunication between cloud brain modules of different robots, analyzing and mining of robot group information to realize cooperating and linking, and through the social modules the robots join in or quit at least one robot group.

2. The cloud robot system of claim 1, wherein the cloud computing platform further comprises:
  a system creating module, configured for cloning a corresponding cloud brain module in the cloud computing platform and a social module for a newly joined robot.

3. The cloud robot system of claim 1, wherein the cloud computing platform comprises super computers, computer cluster and distributed interconnected computers.

4. The cloud robot system of claim 1, wherein the cloud brain module being parallelly distributed processes the data, status and requests sent from the robots.

5. The cloud robot system of claim 1, wherein the computing ability and storage capacity of the cloud computing platform are expandable, and the computing and storage resources are allocated according to demand of robots.

6. A method of integrating a cloud robot system, comprising:
  accessing a cloud computing platform by robots through communication modules;
  sending performance information containing data collected by sensors, status of the robots and request to the cloud computing platform by robots;
  processing the data, status and request by the cloud computing platform, and sending a processing result back to the robots, sending control instructions to a corresponding robot according to the request; the cloud computing platform further querying and analyzing robot group information;
  processing requests from the robot itself by a local brain module; and
  controlling behavior and status of said robots according to the processing result,
  wherein said robots receive the process results from the cloud computing platform and perform according to the control instructions sent from the cloud computing platform; the robots further communicate through the cloud computing platform, wherein the robot comprises a first communication module, the cloud computing platform comprises a second communication module;

the step of accessing a cloud computing platform by robots through communication modules comprises: the robot and the cloud computing platform establishing wired or wireless connections to communicate through the first communication module and the second communication module; and all the robots under a same cloud computing platform communicating with each other through the same cloud computing platform, further comprising through a cloud brain module, the cloud computing platform storing knowledge base, inference engine, neural network, data and experience of the robot; and processing the data, status and request sent from the robots, sending back the processing result to the robots, and through a social module, the cloud computing platform providing intercommunication between cloud brain modules of different robots, analyzing and mining of robot group information to realize cooperating and linking through the social module the robots join in or quit the robot group.

7. The method of claim 6 further comprising:

through a system creating module, the cloud computing platform cloning a corresponding cloud brain module in the cloud computing platform and a social module for a newly joined robot.

8. The method of claim 6, wherein the cloud computing platform comprises super computers, computer cluster and distributed interconnected computers.

9. The method of claim 6, wherein the cloud brain module being parallelly distributed processes the data, status and request sent from the robots.

10. The method of claim 6, wherein the computing ability and storage capacity of the cloud computing platform are expandable, and the computing and storage resources are allocated according to demand of robots.

* * * * *